United States Patent [19]

Dunn

[11] 4,247,120
[45] Jan. 27, 1981

[54] SOUND RECORDING

[76] Inventor: Halbert B. Dunn, 563 Alletra Ave., Bridgewater, N.J. 08807

[21] Appl. No.: 20,068

[22] Filed: Mar. 13, 1979

Related U.S. Application Data

[63] Continuation of Ser. No. 859,478, Dec. 12, 1977, abandoned.

[51] Int. Cl.³ .............................................. G11B 3/44
[52] U.S. Cl. ..................................... 369/173; 369/170
[58] Field of Search .................... 274/24 R, 25, 37, 38

[56]  References Cited

U.S. PATENT DOCUMENTS

| | | | |
|---|---|---|---|
| 1,718,035 | 6/1929 | Douglass | 274/38 |
| 1,836,591 | 12/1931 | Hall | 274/38 |
| 1,879,722 | 9/1932 | Walton | 274/38 |
| 3,104,109 | 9/1963 | Bodkin | 274/38 |
| 3,190,971 | 6/1965 | Lowell | 274/37 |

Primary Examiner—John W. Shepperd
Attorney, Agent, or Firm—Lyon & Lyon

[57]  ABSTRACT

A needle for the acoustic sound box of old phonographs and gramophones is provided with a tip comprising a bearing plate which runs on the top surface of the recording on either side of a groove and a point which conforms to the groove. Both the bearing plate and the point comprise or consist of a low-friction polymer, especially polytetrafluoroethylene. The tip may be coated with the polymer or may be made therefrom, including the case where it deforms during playing to conform to the groove. The needle is especially useful in the re-recording of old cylinders and records using a microphone to capture the sound emanating from the horn or the phonograph or gramophone.

14 Claims, 7 Drawing Figures

SOUND RECORDING

This is a continuation of application Ser. No. 859,478, filed Dec. 12, 1977, now abandoned.

This invention relates to sound recordings and, more especially, to the reproduction of disc and cylinder recordings.

Over the last few years, great interest has developed in early phonograph and gramophone recordings, especially those made from around the beginning of this century to about 1930. Many of the original recordings are, of course, by now extremely rare and, especially because they represent historic testaments to the legendary talents of, for example, opera singers such as Melba and Caruso, famous music hall stars, for example Marie Lloyd and Dan Leno, and early jazz and blues pioneers such as the Original Dixieland Jazz Band and Bessie Smith, considerable efforts have been spent in transferring the recordings from the original discs and cylinders to modern long-playing records, tapes and cassettes.

It should be mentioned here that the early recordings were made by various techniques and were cut both laterally and vertically (by the so-called "Hill-and-Dale" method) on both cylinders and disc records. In general, the present invention applies to all such recordings, but, for convenience only, it will be described more particularly with respect to laterally cut disc recordings, from now on called "records". These records, although commonly designed to be played at 78 revolutions a minute, were also made to be played at other speeds of for example from 60 to 95 rpm, especially from 70 to 90 rpm, and the present invention is not limited either by the speed or the material from which the record is made.

Unfortunately, the original recordings were made on hard materials, notably shellac, and were designed to be played under large sound box weights of, for example, up to 2.5 newtons using needles made from steel, brass or other relatively hard materials including jewels and bamboo and briar wood. In addition the width of the grooves of the recordings varied from company to company.

Even when the original records are found in good condition it is extremely difficult to reproduce them satisfactorily and, more particularly to transfer them satisfactorily to long-playing records, tapes and cassettes, because the obtrusive surface noise cannot be eliminated without cutting frequencies from the recording and destroying or damaging its original character and vitality.

When, more commonly, the original records are found in somewhat mediocre condition because they have been played to a considerable extent, the surface noise and distortion present great problems. The original grooves have been worn away and, more especially, contain minute particles of abraded shellac from the record and abraded metal debris from the needles with which they have been played.

All these problems have been recognised and many and various attempts have been made to overcome them but, to date, no completely satisfactory methods for reproducing and cleaning such records have resulted.

This invention is based on the surprising discovery that significant improvements in the reproduction and cleaning of old grooved recordings can be achieved by using a needle formed from, or coated with, a suitable polymeric material.

In accordance with this observation the present invention provides a needle for use with the sound box of equipment for the reproduction of sound from a grooved recording, which needle comprises, consists of or is coated with a polymeric material at least where it contacts the recording, and which is either provided with a bearing surface, which is adapted to ride on the top surface of the recording on at least one side of a groove, and a point which is adapted to conform to the groove, or is capable of deforming to form such a bearing surface and such a point when the equipment is in operation.

Amongst the properties of the polymer materials which are especially suitable for use in the present invention there may be mentioned (a) a low coefficient of friction (generally corresponding to a coefficient of static friction of not more than 0.05);

(b) a yield strength such that it is capable of deforming and flowing to adapt to the groove under the pressure generated by a sound box weight of up to 2.5 newtons without disintegrating, and (c) adequate flexural strength that it does not significantly reduce the brilliance of the sound produced.

One outstandingly suitable group of polymeric materials for use in the present invention comprises fluorocarbon homopolymers and copolymers whether in pure form or blended with other polymers, especially polytetrafluoroethylene and compositions comprising substantial amounts (e.g. at least 30%, especially at least 60% by weight) thereof. Such polymers and compositions (which are commercially available) exhibit extremely desirable low friction and good lubrication properties.

However, consistent with the inventive principle of the provision of (or formation of) a bearing surface and point, it will be appreciated that other polymeric materials may be suitable. Amongst such materials there may be mentioned, for example, polyamides, polyimides, polycarbons, certain polyolefin based homo- and co-polymers, including polypropylene and silicone homo- and co-polymers.

In one embodiment of the present invention there is provided a replaceable polymeric tip for the playing end of metallic, fibre or other similar gramophone needles. The tip, which may comprise a preformed bearing surface and point or which may be deformable when used to form such a bearing surface and point, can be formed by conventional methods such as extrusion or moulding followed, if desired by a shaping operation such as cutting. It is advantageously provided with a suitably shaped channel away from its playing end for receiving the shank of the needle, which will usually be made from a metal such as steel or brass. The shank may be of circular, truncated circular, triangular, square or other polygonal, e.g. hexagonal, cross-section. In general, a close fit is sufficient to ensure proper location of the tip on the shank but adhesives may be employed to secure them in position.

The configuration of the tip is such that, in accordance with the invention, it rides on the top surface of the record so that the bearing surface acts to distribute the weight of the sound box whilst the point adapts to and follows the contours of the groove. Especially when the polymer is PTFE or a similar substance, it is thought that it acts at the same time as a lubricant between the tip and the groove.

The tip should be designed so that the polymer is sufficiently thick that the weight of the sound box does not cause the shank to rupture the polymer, but preferably sufficiently thin that it does not significantly dampen the vibrations passed to the sound box.

However, whilst the minimum thickness of the polymeric material at the point of the tip is obviously a critical factor it will be understood that, given the criterion that it should in general be as small as possible, so as to give optimum acoustic performance without rupturing under the weight of the sound box, it will be a relatively simple matter to determine this critical thickness by trial and experiment and, more especially, it will be appreciated that the invention is not limited in this respect because the minimum thickness will depend on the equipment which is employed and other variables.

In a second embodiment of the present invention, the polymeric material is provided as a coating on a shank which is preformed with a bearing surface and point. In such a case the polymeric material may be applied as a tape or sheet over the shank in the appropriate region or, advantageously, may be applied by conventional coating methods such as in the case of PTFE by spraying and sintering. The optimum thickness of the coating will be governed by external factors such as groove width and sound box weight, but in general a thickness of from 5 to 30 microns, especially from 8 to 15 microns, will be appropriate.

The bearing surface, which distributes the weight of the sound box may be a plate in the form of a preformed collar or may be a preformed shoulder (such a shoulder will also be formed when a polymeric tip deforms under the weight of the sound box to form the bearing surface and point). The bearing surface, e.g. the collar or shoulder, may be annular or, when the sound box weight is high, may be longer in the direction of the grooves so as to provide a greater area of pressure distribution. In order to ensure the smooth ride the bearing surface preferably lies parallel to the surface of the record when the sound box is in its playing position. Very few sound boxes operate with the shank in the vertical position relative to the record and, most commonly, they operate at a shank angle of from 35° to 60° from vertical, so that the lower surface of the bearing plate preferably lies at an angle of from 35° to 70° with respect to the shank, especially from 51° to 57°.

This angle only applies in the direction of travel of the needle and, for this reason, it is often advantageous to provide the needle with a non-circular shank so that it may more easily be properly oriented in the sound box, one of the sides of a non-circular shank may be marked for this purpose. Of course, in other applications only the top part of the shank need be modified for this purpose. Other variations will be apparent to those skilled in the art and the present invention contemplates all such means for correctly orientating the needle with respect to the grooves of the record.

As is known, a thicker shank produces a louder tone and, therefore, especially when a polymeric tip is employed it will be desireable to use a relatively thick shank in order to overcome the "soft-tone" which may result from the acoustic damping effect of the polymer. However, a suitable shank thickness can readily be determined by simple trial and experiment.

In part, this invention is based on another surprising observation. Until now, efforts at reproducing old records have in general employed methods in which an electric signal from the sound box, or more usually from an electric pick-up, is conveyed directly to the input of the amplifier or pre-amplifier of modern hi-fidelity equipment. It has now surprisingly been found that the vitality of these old recordings can more accurately be captured by using a high quality microphone to record the sound produced by the external or internal horns of the phonographs and gramophones of the period. By correctly positioning the microphone in relation to the horn it is possible to obtain quite remarkable recordings. The needles of the present invention are, of course, ideal for such methods and, in one aspect, the present invention provides a method of re-recording an original grooved recording, especially by such a microphone technique, wherein the needles described above are employed. The present invention also provides recordings, for example, on long-playing records, tapes and cassettes, made by such methods.

It will be appreciated that in such recording methods the surface and the grooves of the original record should be as clean as possible. For example, the grooves may be cleaned by conventional methods, and may, if desired be treated with a light surface coating of a lubricant such as a household polish or a commercial silicone spray.

However, as is known, such methods are not wholly successful in removing the particles which have accumulated in the grooves of much-played records and another surprising observation is that when a "cleaned" record is played with a needle of the type described above and the tip inspected under a microscope an astonishing amount of metal debris is shown to have been collected and, therefore, removed from the grooves. When, on the other hand, the record is played with a conventional thorn needle, no debris is collected.

It would appear, therefore, that because the points of the needles of the present invention are more able to conform to the grooves of the record they are able to contact and remove much more debris. Accordingly, the present invention also provides a method of cleaning old records using the needles described above.

Yet another advantage of the present invention is that because the polymeric point is able to conform to the groove, further damage to the groove is substantially avoided.

Various embodiments of the present invention will now be described in more detail, by way of example only, with reference to the drawings in which FIG. 1 shows a needle according to the present invention positioned within a sound box;

Figure 1:
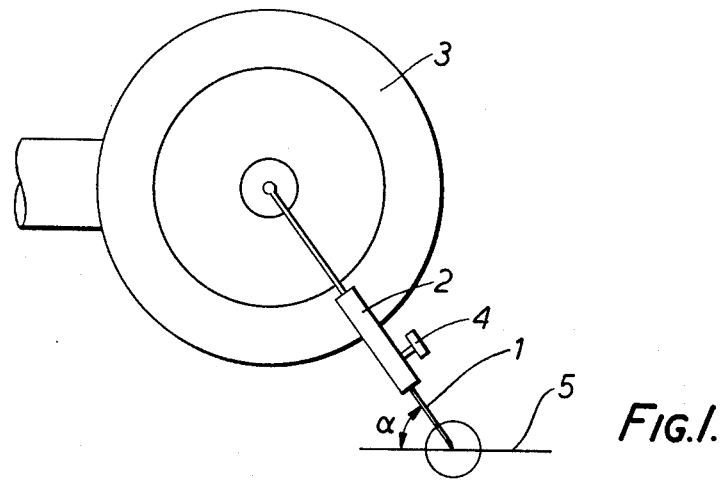

Referring now to the drawings, in FIG. 1 there is shown a needle in accordance with the present invention located in the shaft 2 of a sound box 3 by means of the usual lock screw 4. By virtue of arrangement of the sound box 3, the needle contacts the surface of a record 5.

Figure 2:
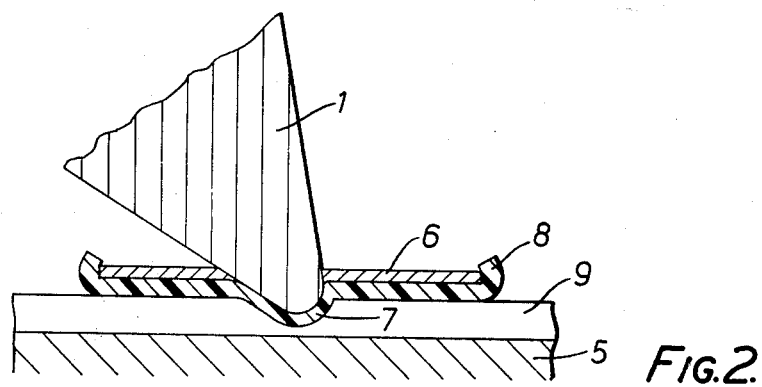
FIG. 2 is a section taken along the line of a groove of a record showing in more detail how the needle lies in relation to the groove.

As shown in FIG. 2, the tip of the shank 1 of the needle, which is mainly made from hard material such as steel, is formed so as to be provided with a bearing plate 6 and a point 7. In accordance with the present invention the lower surface of the bearing plate 6 and the point 7 are coated with a layer 8 of polytetrafluoroethylene.

Figure 3:
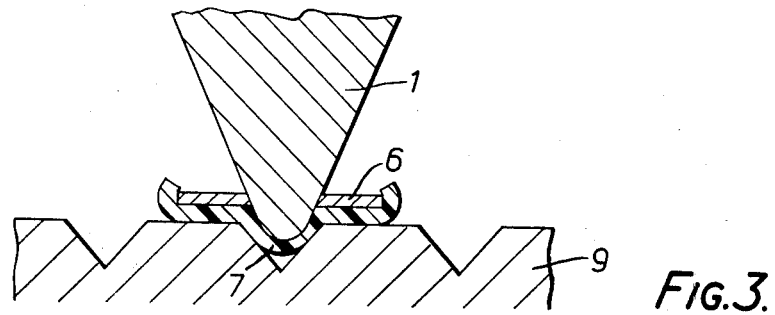
FIG. 3 is a section taken across the line of the groove of the record.

As shown more clearly in FIG. 3, the coated bearing plate 6 rests on the upper surface of the record 5 on either side of the groove 9 and the coated point 7 substantially conforms to the groove 9.

The angle α shown in FIG. 1 is typically about 53°. The depth of the groove 9 is typically from 25 to 50 microns and the width of the groove 9 is typically from 0.5 to 0.8 mm. The radius of the coated point 7 is advantageously about 25 microns. The width of the bearing collar 6 is advantageously about 150 microns.

In this embodiment, the bearing plate 6 is in the form of an annular collar of width of about 150 microns. When the sound box weight is higher, however, it may be desirable to make the plate longer in the direction of the groove to provide a greater bearing surface. The length may for example be about 500 microns as opposed to a width of about 150 microns.

As can be seen, the coated bearing plate ensures that the needle rides smoothly on the top surface of the record 5 whilst the coated point 7 conforms to the groove 9.

Figure 4:
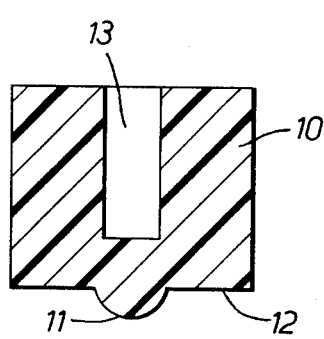
FIG. 4 is a section through a needle tip in accordance with the present invention.

In FIG. 4 there is shown in cross section a needle tip 10 made in accordance with the present invention. The tip 10 has a point 11 and a bearing surface provided by a shoulder 12. It is also provided with a channel 13 which is adapted to receive the shank of a needle. The tip 10 is, as it will be appreciated, in other respects similar to the coated tip of needle of FIGS. 1 to 3, the bearing surface making an angle of about 53° with the shank.

Figure 5:
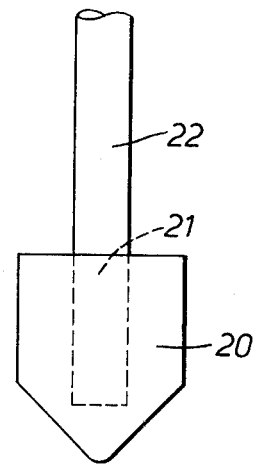
FIG. 5 is a view of the tip of another needle in accordance with the present invention.
Figure 6:
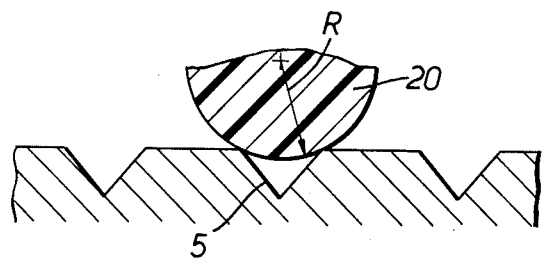
FIG. 6 is a section taken across the line of a groove of a record showing the tip of FIG. 5 in its initial state.
Figure 7:
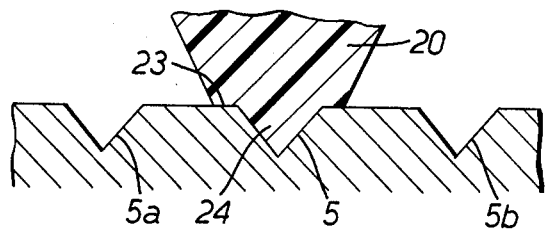
FIG. 7 is a similar section showing the tip of FIG. 5 after it has been deformed by the pressure of a pick-up.

In FIGS. 5 to 7 there is shown a second form of needle tip in accordance with the present invention. This tip 20 is preferably made from polytetrafluoroethylene and is provided with a channel 21 for receiving a needle shank 22. As shown in FIG. 6, the lowest point of tip 20 is curved and has a radius R, preferably in the range of from 0.1 mm to 0.2 mm which is related to the width of the groove 5 so that, on deformation under the weight of the pick-up, the position shown in FIG. 7 is obtained.

As can be seen from FIG. 7, the tip 20 has deformed and flowed so as to provide a bearing surface 23 and a point 24 adapted to conform with groove 5. On the other hand, the extent of deformation is not so great that the tip 20 comes into contact with adjacent grooves 5a and 5b, which could lead to "double tracking". A tip of the type shown in FIGS. 5 and 7 is especially suitable for cleaning old records insofar as it may be used for this purpose even if its dimensions are not exactly related to those of the grooves of the record. However, in many cases it will, as described above, be useful in re-recording, once it is deformed so as to adapt itself to the configuration of the grooves.

Other suitable configurations of the needles of the present invention will be apparent to those skilled in the art.

I claim:

1. A needle for use with the sound box of equipment for the reproduction of sound from a grooved recording, which needle comprises a shank made from metal or another relatively rigid material, said shank being formed so as to provide a point adapted to conform to the grooves of the recording and to provide a bearing surface which is in the form of a preformed collar which surrounds and is attached to the shank of the needle and which is adapted to ride on the top surface of the recording on each side of a groove but which does not extend to the next adjacent grooves, the point and the bearing surface each being coating with a polymeric material.

2. A needle as claimed in claim 1, which comprises a shank made from metal or another relatively rigid material, which shank is formed so as to provide the bearing surface and the point, both of which are coated with the polymeric material.

3. A needle as claimed in claim 2, wherein the coating is from 5 to 30 mircons thick.

4. A needle as claimed in claim 3, wherein the coating is from 8 to 15 microns thick.

5. A needle as claimed in claim 1, wherein the bearing surface is part of a preformed shoulder on the shank of the needle.

6. A needle as claimed in claim 1, wherein the length of the bearing surface in the direction of the grooves is greater than its width.

7. A needle as claimed in claim 6, wherein the length of the bearing surface is from 400 to 600 microns.

8. A needle as claimed in claim 1, wherein the bearing surface extends on an acute angle to the shank of the needle in the direction of the grooves.

9. A needle as claimed in claim 8, wherein said angle is from 35° to 70°.

10. A needle as claimed in claim 9, wherein said angle is from 51° to 57°.

11. A needle as claimed in claim 1, wherein the polymeric material is based on a fluorocarbon.

12. A needle as claimed in claim 11, wherein the polymeric material is polytetrafluoroethylene or a blend containing at least 30% by weight thereof.

13. A needle for use with the sound box of equipment for the reproduction of sound from a grooved recording, which needle comprises a shank made from a metal or another relatively rigid material, said shank being provided with a curved tip made from a polymeric material, which tip is deformable in a groove of the recording under the weight of a sound box so as to provide a point which conforms to the groove and to provide a bearing surface which rides on the top surface of the recording on each side of the groove but which does not extend to the next adjacent grooves.

14. A needle for use with the sound box of equipment for the reproduction of sound from a grooved recording, which needle comprises a shank made from metal or another relatively rigid material, said shank being formed so as to provide a point adapted to conform to the grooves of the recording and to provide a bearing surface which is part of a preformed shoulder on the shank of the needle and which is adapted to ride on the top surface of the recording on each side of a groove but which does not extend to the next adjacent grooves, the point and the bearing surface each being coated with a polymeric material.

* * * * *